(12) United States Patent
Willard (10) Patent No.: US 6,857,686 B2
(45) Date of Patent: Feb. 22, 2005

(54) TWO-WAY OPENING DECKLID FOR A CONVERTIBLE ROOF VEHICLE

(75) Inventor: Michael Willard, Harrison Township, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 10/361,163

(22) Filed: Feb. 6, 2003

(65) Prior Publication Data

US 2004/0155480 A1 Aug. 12, 2004

(51) Int. Cl.[7] .................................................. B60J 7/00
(52) U.S. Cl. ..................................... 296/107.08; 296/76
(58) Field of Search ............................ 296/107.08, 76, 296/107.17, 136

(56) References Cited

U.S. PATENT DOCUMENTS

| | | |
|---|---|---|
| 1,774,199 A | 8/1930 | Good |
| 1,933,623 A | 11/1933 | Gordon |
| 1,990,848 A | 2/1935 | Velo |
| 2,800,361 A | 7/1957 | Kubacka |
| 3,211,494 A | 10/1965 | Husko |
| 3,304,117 A | 2/1967 | Harris et al. |
| 3,525,687 A | 8/1970 | Ross et al. |
| 4,776,626 A | 10/1988 | Seyler |
| 4,966,403 A | 10/1990 | Nordstrom |
| 4,973,097 A | 11/1990 | Hosan et al. |
| 5,533,777 A | 7/1996 | Kleemann et al. |
| 5,551,743 A | 9/1996 | Klein et al. |
| 5,823,606 A | 10/1998 | Schenk et al. |
| 5,904,395 A | 5/1999 | Wedin |
| 5,944,378 A | 8/1999 | Mather et al. |
| 5,967,590 A | 10/1999 | Beierl et al. |
| 5,975,619 A | 11/1999 | Dettling et al. |
| 6,010,178 A | 1/2000 | Hahn et al. |
| 6,019,417 A | 2/2000 | Haberl |

(List continued on next page.)

FOREIGN PATENT DOCUMENTS

| | | |
|---|---|---|
| DE | 4136895 C1 | 11/1992 |
| DE | 4445580 C1 | 12/1995 |
| DE | 4445941 C1 | 3/1996 |
| DE | 4445944 C1 | 4/1996 |
| DE | 4446483 A1 | 6/1996 |
| DE | 4445920 A1 | 7/1996 |
| DE | 19514022 C1 | 9/1996 |

*Primary Examiner*—Lori L. Coletta
(74) *Attorney, Agent, or Firm*—Harness, Dickey & Pierce, P.L.C.

(57) ABSTRACT

A two-way opening modular decklid assembly is disclosed. The modular decklid assembly includes a frame and a decklid that are installed in a vehicle as a modular unit. The decklid assembly uses a simple at least four-bar non-scissor linkage assembly to attach a frame to the vehicle. The linkage assembly is operable to move the frame between open and closed positions.

48 Claims, 12 Drawing Sheets

U.S. PATENT DOCUMENTS

| | | | |
|---|---|---|---|
| 6,030,023 | A | 2/2000 | Guillez |
| 6,039,382 | A | 3/2000 | Mather et al. |
| 6,062,628 | A | 5/2000 | Guillez |
| 6,070,929 | A | 6/2000 | Barkley |
| 6,092,335 | A | 7/2000 | Queveau et al. |
| 6,142,555 | A | 11/2000 | Huber |
| 6,145,915 | A | 11/2000 | Queveau et al. |
| 6,164,713 | A | 12/2000 | Graf et al. |
| 6,186,577 | B1 | 2/2001 | Guckel et al. |
| 6,193,300 | B1 | 2/2001 | Nakatomi et al. |
| 6,217,104 | B1 | 4/2001 | Neubrand |
| 6,217,105 | B1 | 4/2001 | Hollerbach |
| 6,250,707 | B1 | 6/2001 | Dintner et al. |
| 6,254,165 | B1 | 7/2001 | Neubrand |
| 6,293,605 | B2 | 9/2001 | Neubrand |
| 6,325,445 | B1 | 12/2001 | Schenk |
| 6,352,298 | B1 | 3/2002 | Hayashi et al. |
| 6,357,815 | B1 | 3/2002 | Queveau et al. |
| 6,361,097 | B1 | 3/2002 | Lechkun |
| 6,386,615 | B2 | 5/2002 | Neubrand et al. |
| 6,419,294 | B2 * | 7/2002 | Neubrand .................... 296/76 |
| 6,572,175 | B2 * | 6/2003 | Schutt et al. .......... 296/107.17 |
| 2001/0042991 | A1 | 11/2001 | Schuler et al. |
| 2001/0048231 | A1 | 12/2001 | Ellermann et al. |
| 2002/0011739 | A1 | 1/2002 | Nicastri |
| 2002/0014782 | A1 | 2/2002 | Neubrand |
| 2002/0036413 | A1 | 3/2002 | Neubrand et al. |
| 2002/0041109 | A1 | 4/2002 | Wagner et al. |
| 2002/0093218 | A1 | 7/2002 | Weissmueller et al. |
| 2003/0071479 | A1 * | 4/2003 | Schaller et al. ............. 296/136 |

\* cited by examiner

TWO-WAY OPENING DECKLID FOR A CONVERTIBLE ROOF VEHICLE

BACKGROUND AND SUMMARY OF THE INVENTION

The present invention is generally related to decklids for a convertible roof vehicle, and more particularly to a two-way opening decklid for a convertible roof vehicle.

Automotive vehicles having a convertible roof typically stow the convertible roof (when retracted) in a stowage compartment that is behind or aft of the passenger seating area. To provide a desired appearance, the retracted convertible roof can be covered by a tonneau panel. The tonneau panel can be designed to cover the entirety of the stowed convertible roof or a portion thereof. The tonneau panel can also be used to cover the stowage compartment when the convertible roof is in the raised or extended position. To accommodate the movement of the convertible roof from the stowed to the raised position and vise versa, the tonneau panel is operated between open and closed positions to allow access to the stowage compartment.

In some convertible roof vehicles, the convertible roof does not occupy an entire storage area aft of the passenger seating area. For example, the area aft of the passenger seating area can include a stowage compartment for the convertible roof along with a general storage area or trunk behind or aft of the stowage area. The general storage area is covered by a trunk lid, known as a decklid, that moves between open and closed positions to allow access to the general storage area. Accordingly, combination decklids and tonneau panels have been devised that open in opposite directions to allow access to the general storage area from a rear of a vehicle and access to the stowage compartment from a forward position on the vehicle. Thus, two-way opening decklids and tonneau panels are known. However, the conventional mechanisms used to provide the two-way opening functionality can be complex and employ a large number of complicated links to provide the two-way opening functionality. Additionally, the installation of such two-way opening decklids can be difficult, involve multiple steps and be time consuming.

In accordance with the present invention, a two-way opening decklid assembly includes a frame and a decklid that are installed in a vehicle as a modular unit. In another aspect of the present invention, the decklid assembly uses at least a four-bar non-scissor linkage assembly to attach a frame to the vehicle and is operable to move the frame between open and closed positions.

The present invention is advantageous over traditional two-way opening decklid assemblies in that the two-way opening decklid assembly can be installed in a vehicle as a modular unit. This increases quality while reducing assembly line space, customer part count and difficult assembly ergonomics. Furthermore, the present invention is advantageous because the decklid assembly utilizes a simple linkage assembly that causes the frame to move between open and closed positions which allows the convertible roof to move between retracted and extended positions. The decklid assembly of the present invention can be utilized in an automotive vehicle having a hardtop convertible roof or a soft-top convertible roof. Additional advantages and features of the present invention will become apparent from the following description and appended claims taken in conjunction with the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1A:
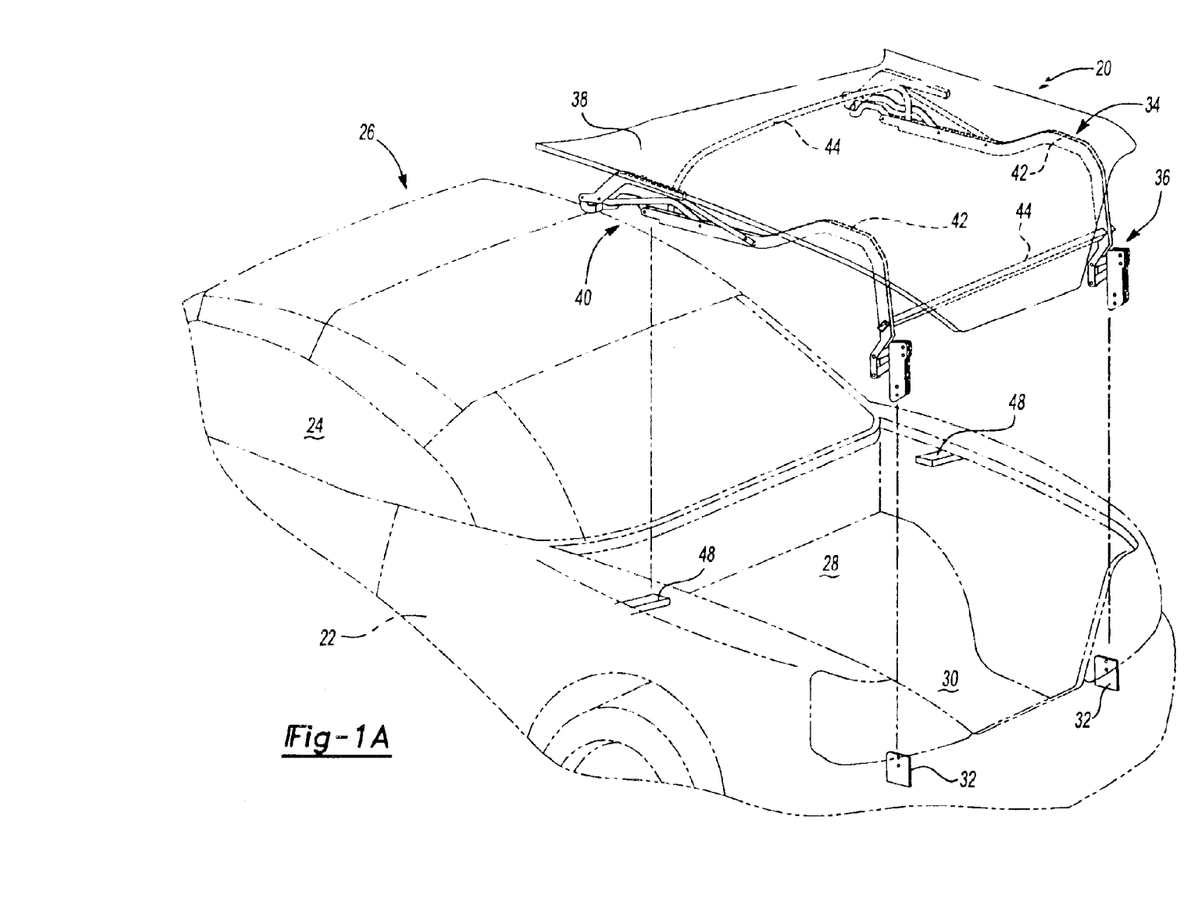
FIG. 1A is a perspective view of the preferred embodiment of a modular decklid assembly according to the principles of the present invention.

Referring to FIG. 1A, the preferred embodiment of a modular decklid assembly 20 according to the principles of the present invention is shown. Modular decklid assembly 20 is used in an automotive vehicle 22 having a passenger compartment 24, a convertible roof system 26, a stowage compartment 28 for the convertible roof system, and a storage area or trunk 30. Stowage compartment 28 and storage area 30 can be a combined area that is not differentiated by a physical barrier or can be two separate areas separated by a physical barrier. Stowage compartment 28 and storage area 30 are both located behind passenger compartment 24. Stowage compartment 28 retains convertible roof system 26 when the convertible roof is in the retracted position, as described below. Attachment points, in this case in the form of brackets 32, are located in the rear portion of storage area 30 and allow modular decklid assembly 20 to be installed in vehicle 22, as described below.

Modular decklid assembly 20 includes a frame 34, rear linkage assemblies 36, a decklid 38, and front linkage assemblies 40. Frame 34 includes two longitudinal members 42 and two transverse members 44 that space longitudinal members 42 apart and are attached to respective front and rear portions of longitudinal members 42.

A front portion of decklid 38 is pivotably pivotally coupled to a front portion of frame 34 by front linkage assemblies 40. Front linkage assemblies 40 allow decklid 38 to move between open and closed positions to allow access to storage area 30 independent of movement of frame 34, as described below. Rear linkage assemblies 36 are attached to a rear portion of frame 34 and are adapted to be attached to brackets 32 on vehicle 22. Rear linkage assemblies 36 are operable to cause frame 34 to move between open and closed positions to allow retraction and extension of convertible roof system 26, as described below.

Modular decklid assembly 20 is installed in vehicle 22 as a modular unit. That is, frame 34, decklid 38, and rear and front linkage assemblies 36 and 40 are preassembled in a separate facility or in a static station, preferably with the external surface of the decklid facing down. Then modular decklid assembly 20 is installed in storage area 30 of vehicle 22 as a modular unit on the assembly line, which may be a moving one, prior to the painting process. To install modular decklid assembly 20, one of the links in each of the two rear linkage assemblies 36 is aligned with brackets 32 in storage area 30 of vehicle 22. The one link of each rear linkage assembly 36 is preferably attached to brackets 32 with bolts. However, it should be understood that other means of attaching a link in each of the rear linkage assemblies 36 to brackets 32 can alternately be employed. For example, a link in each rear linkage assembly 36 can be welded to brackets 32 if desired.

After installing modular decklid assembly 20 in vehicle 22, a powered actuator 46 (shown in FIGS. 2–4) is attached to a rear portion of storage area 30 and to one of the links in each rear linkage assembly 36. Powered actuator 46 is operable to move rear linkage assemblies 36 and cause frame 34 to move between the opened and closed positions. Powered actuator 46 can take a variety of forms. Preferably, powered actuator 46 is a hydraulic cylinder that moves between extended and retracted positions to operate rear linkage assemblies 36. Alternatively, powered actuator 46 could be in the form of an electric motor that drives rear linkage assemblies 36.

Figure 1B:
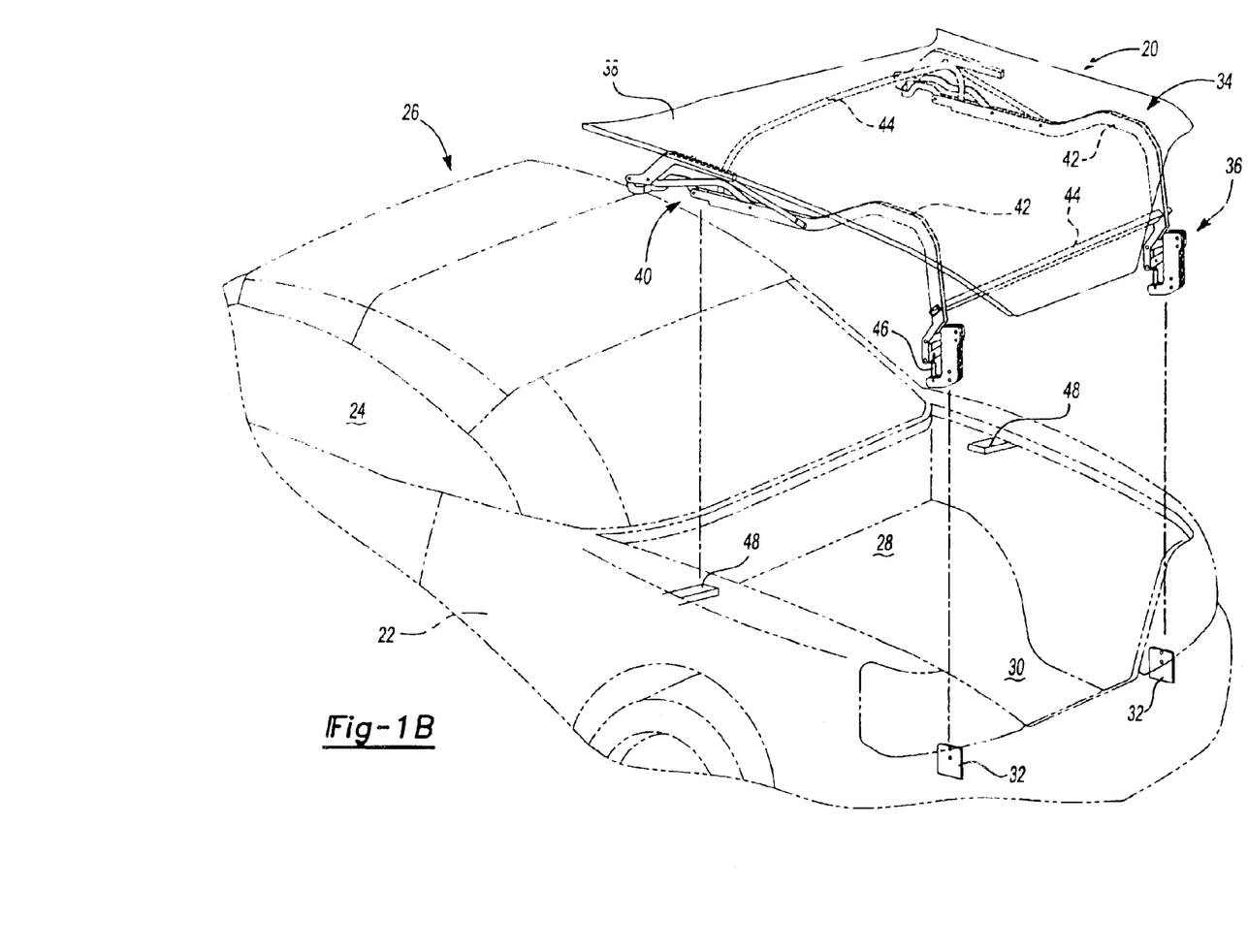
FIG. 1B is a perspective view of an alternate embodiment of a modular decklid assembly with an integral powered actuator according to the principles of the present invention.

In an alternate embodiment, as shown in FIG. 1B, each end of powered actuator 46 is attached to two links of each rear linkage assembly 36. Operation of the powered actuators 46 between extended and retracted positions then causes rear linkage assemblies 36 to move which in turn causes frame 34 to move between its open and closed positions. In this alternate embodiment, powered actuators 46 are part of modular decklid assembly 20. That is, frame 34, decklid 38, rear and front linkage assemblies 36 and 40, and powered actuators 46 are all installed in vehicle 22 as a modular unit. A power source is later connected to powered actuators 46 to drive powered actuators 46 as desired.

Figure 2:
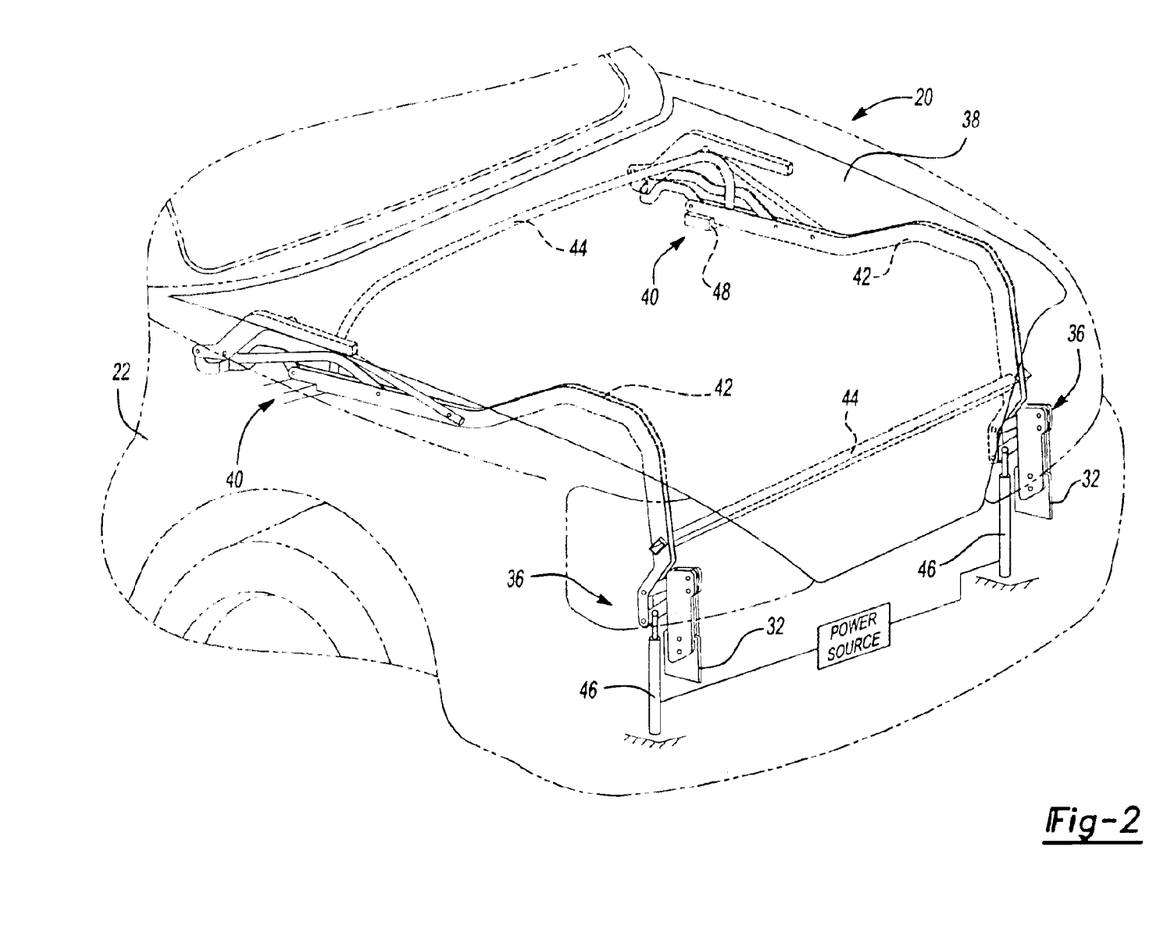
FIG. 2 is a fragmented perspective view of a convertible roof vehicle with the decklid assembly according to the principles of the present invention.
Figure 3:
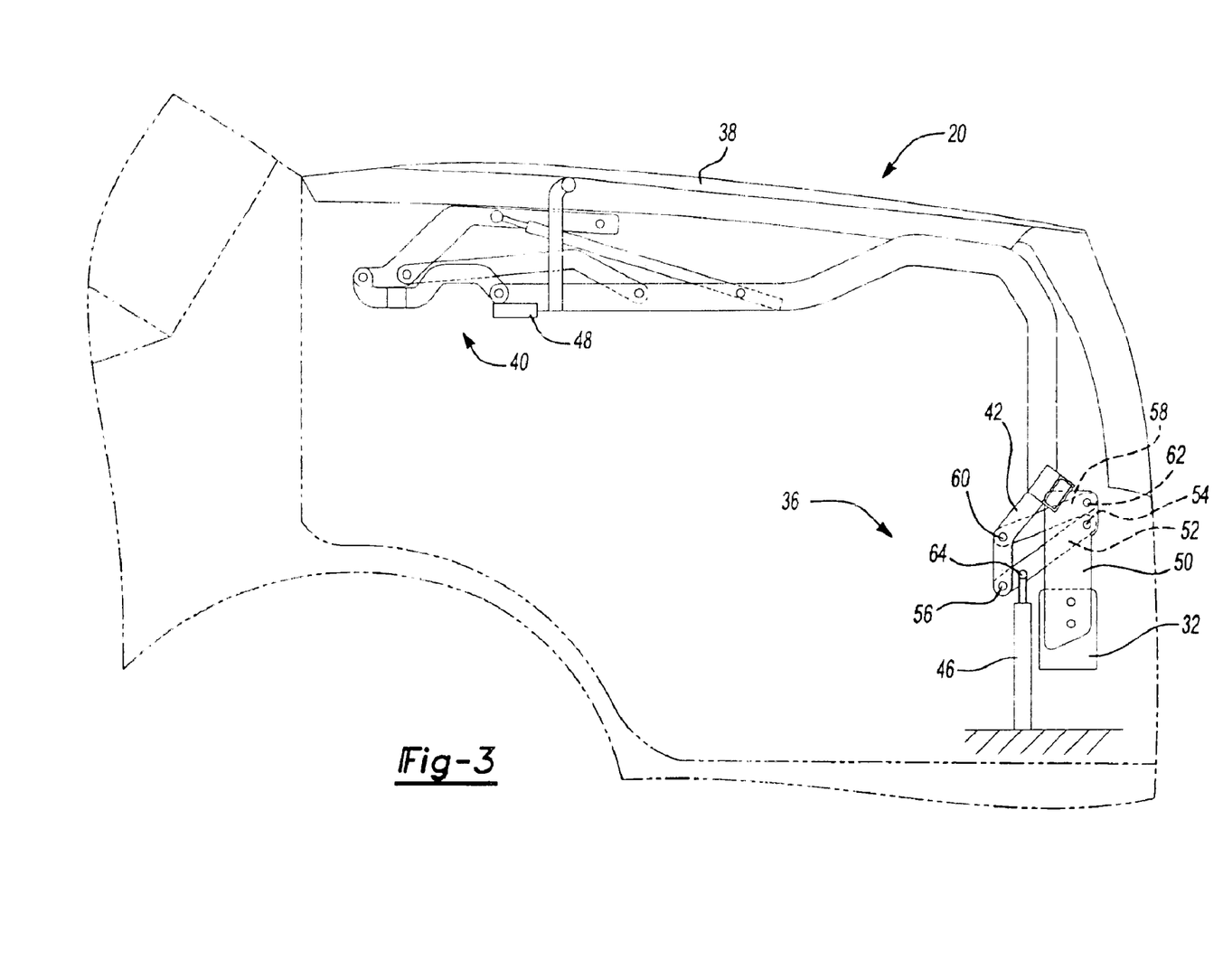
FIG. 3 is a fragmented elevation view of the vehicle of FIG. 2 showing the decklid assembly in a closed position.

Referring now to FIGS. 2 and 3, modular decklid assembly 20 is shown installed in vehicle 22 with rear linkage assemblies 36 attached to brackets 32 in storage area 30. A front portion of frame 34 rests on stops 48 of vehicle 22. Because each rear linkage assembly 36 is substantially an identical mirror image of the other and because each front linkage assembly 40 is also substantially an identical mirror images of the other, only the passenger side rear and front linkage assemblies 36 and 40 will be described in greater detail.

Figure 4:
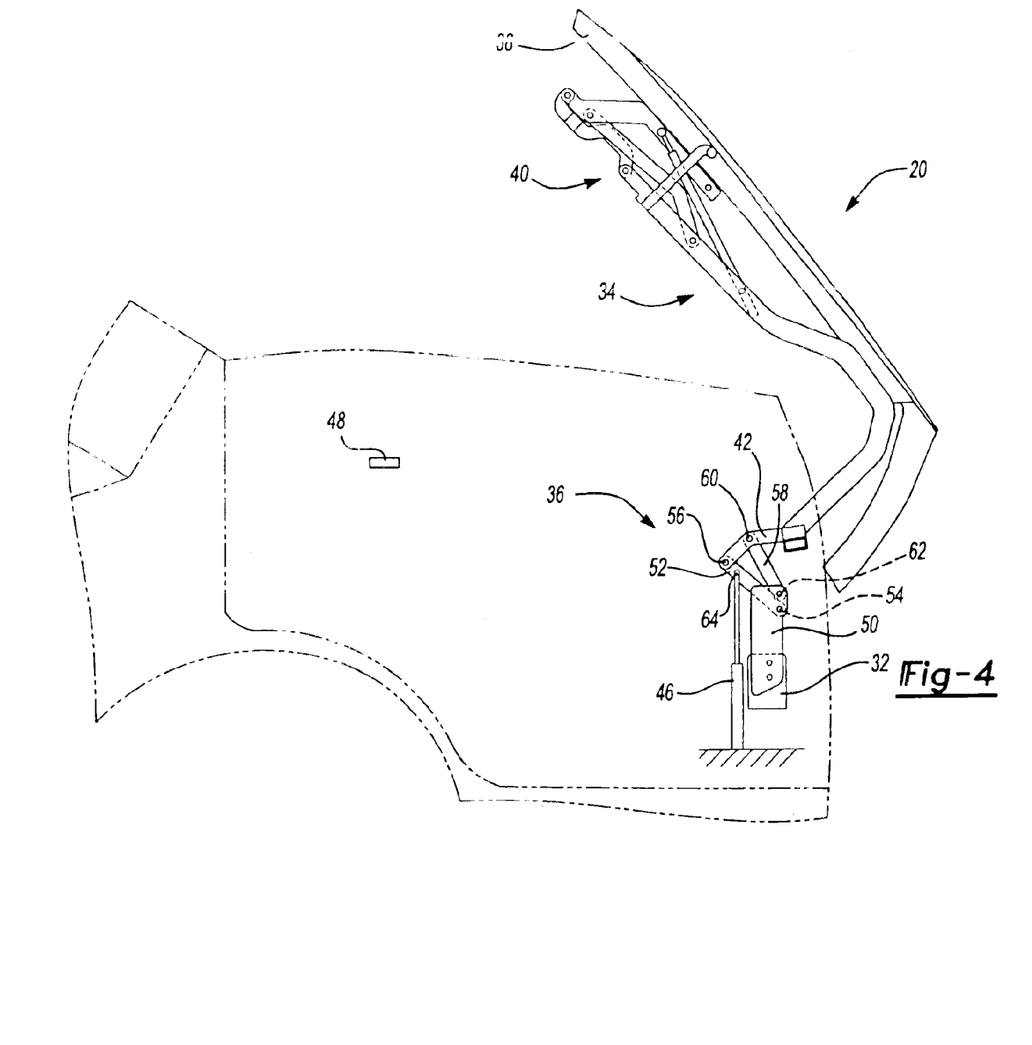
FIG. 4 is a fragmented elevation view of the vehicle of FIG. 2 with the decklid assembly open to allow retraction and extension of the convertible roof.

FIGS. 3 and 4 illustrate rear linkage assembly 36 which includes a first link 50 that fixedly attaches rear linkage assembly 36 to bracket 32 of vehicle 22. First link 50 thereby is a fixed link that remains stationary regardless of movement of rear linkage assembly 36. One end of a second link 52 is pivotally attached to first link 50 at pivot 54 while the other end of second link 52 is pivotally attached to a rear portion of longitudinal member 42 of frame 34 at pivot 56. One end of a third link 58 is pivotally attached to a rear portion of longitudinal member 42 of frame 34 at pivot 60 while the other end of third link 58 is pivotally attached to first link 50 at pivot 62. Thus, rear linkage assembly 36 forms a four-bar non-scissor linkage assembly which includes first link 50, second link 52, longitudinal member 42, and third link 58 and is defined by pivots 54, 56, 60, and 62. In other words, rear linkage assembly 36 is a four-bar linkage assembly wherein each link of the linkage assembly is attached to two or less other links of the linkage assembly, thus being a non-scissor linkage assembly. In the preferred embodiment, second and third links 52 and 58 may overlap when frame 34 is moved between its open and closed positions, however, second and third links 52 and 58 do not cross over one another when frame 34 is moved between its open and closed positions.

One end of powered actuator 46 is pivotally attached to second link 52 at pivot 64 while the other end of powered actuator 46 is attached to vehicle 22. As can be seen in FIG. 3, when powered actuator 46 is in a retracted position, frame 34 is in the closed position and decklid 38 covers stowage compartment 28 along with storage area 30. As powered actuator 46 moves between its retracted position to its extended position, as shown in FIG. 4, second link 52 is pushed by powered actuator 46 and causes frame 34 to rotate clockwise (as shown in FIG. 4) and move to its open position. When frame 34 is in its open position, decklid 38 is no longer covering stowage compartment 28 and convertible roof system 26 can be operated to move between its extended and retracted positions. It is preferred that decklid 38 remain in its closed position when frame 34 is moved from between its open and closed positions. In other words, it is preferred that decklid 38 remain stationary relative to frame 34 as frame 34 moves between its open and closed positions. Thus, powered actuator 46 pushes or pulls second link 52 away from or toward powered actuator 46 which causes frame 34 to pivot and allows access to stowage compartment 28 so that convertible roof system 26 can move between extended and retracted positions.

Figure 5:
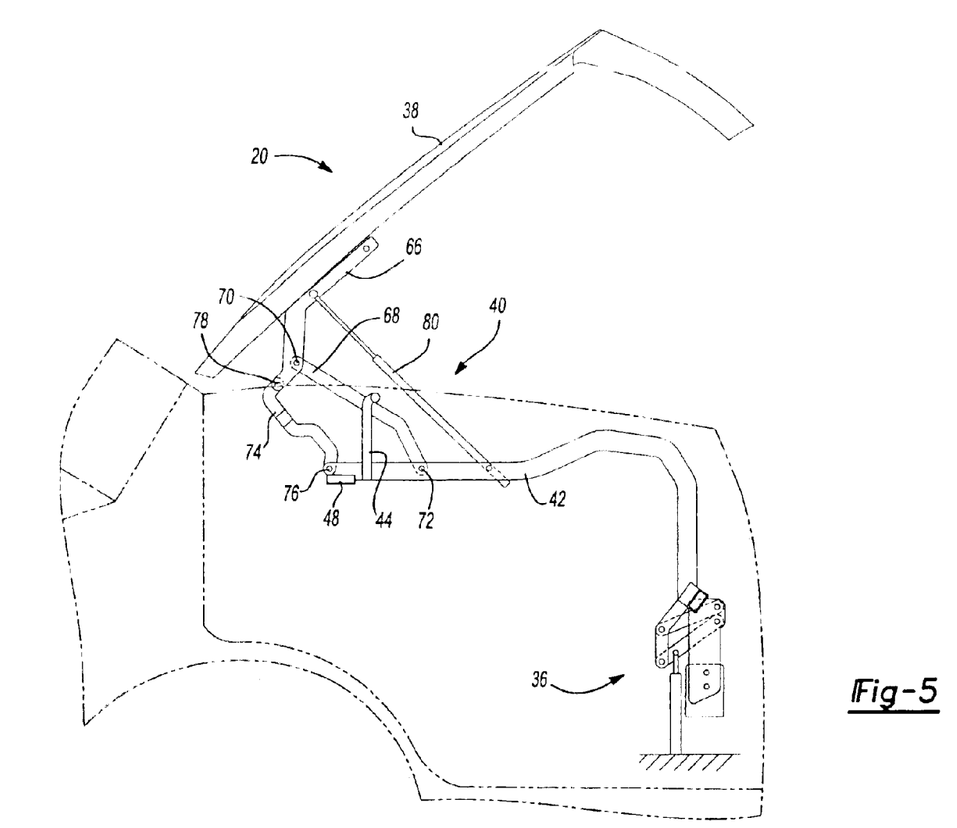
FIG. 5 is a fragmented elevation view of the vehicle of FIG. 2 with the decklid assembly in an open position allowing access to a rear storage area of the vehicle.

Referring now to FIGS. 3 and 5, it can be seen that front linkage assembly 40 is operable to allow decklid 38 to move between its closed position, as shown in FIG. 3, and its open position, as shown in FIG. 5, which allows access to storage area 30. Front linkage assembly 40 includes a first link 66 which is fixedly attached to a front portion of decklid 38. One end of a second link 68 is pivotally attached to first link 66 at pivot 70 while the other end of second link 68 is pivotally attached to a front portion of longitudinal member 42 of frame 34 at pivot 72. One end of a third link 74 is pivotally attached to the front portion of longitudinal member 42 at pivot 76 further forward of pivot 72 while the other end of third link 74 is pivotally attached to first link 66 at pivot 78. First link 66, second link 68, longitudinal member 42, and third link 74 thereby form a four-bar linkage assembly defined by pivots 70, 72, 76 and 78 which allows decklid 38 to move between open and closed positions. A biasing member 80, in this case in the form of gas strut, is attached to longitudinal member 42 and first link 66. Gas strut 80 helps retain decklid 38 in the open position. Preferably, gas strut 80 is installed after the vehicle body and modular decklid assembly 20 have gone through the painting process. Alternatively, other biasing mechanisms can be used, such as springs, without departing from the scope of the present invention. Decklid 38 is capable of moving between its open and closed positions independently of movement of frame 34. Thus, frame 34 can remain stationary and/or in its closed position while decklid 38 moves between its open and closed positions.

Figure 6A:
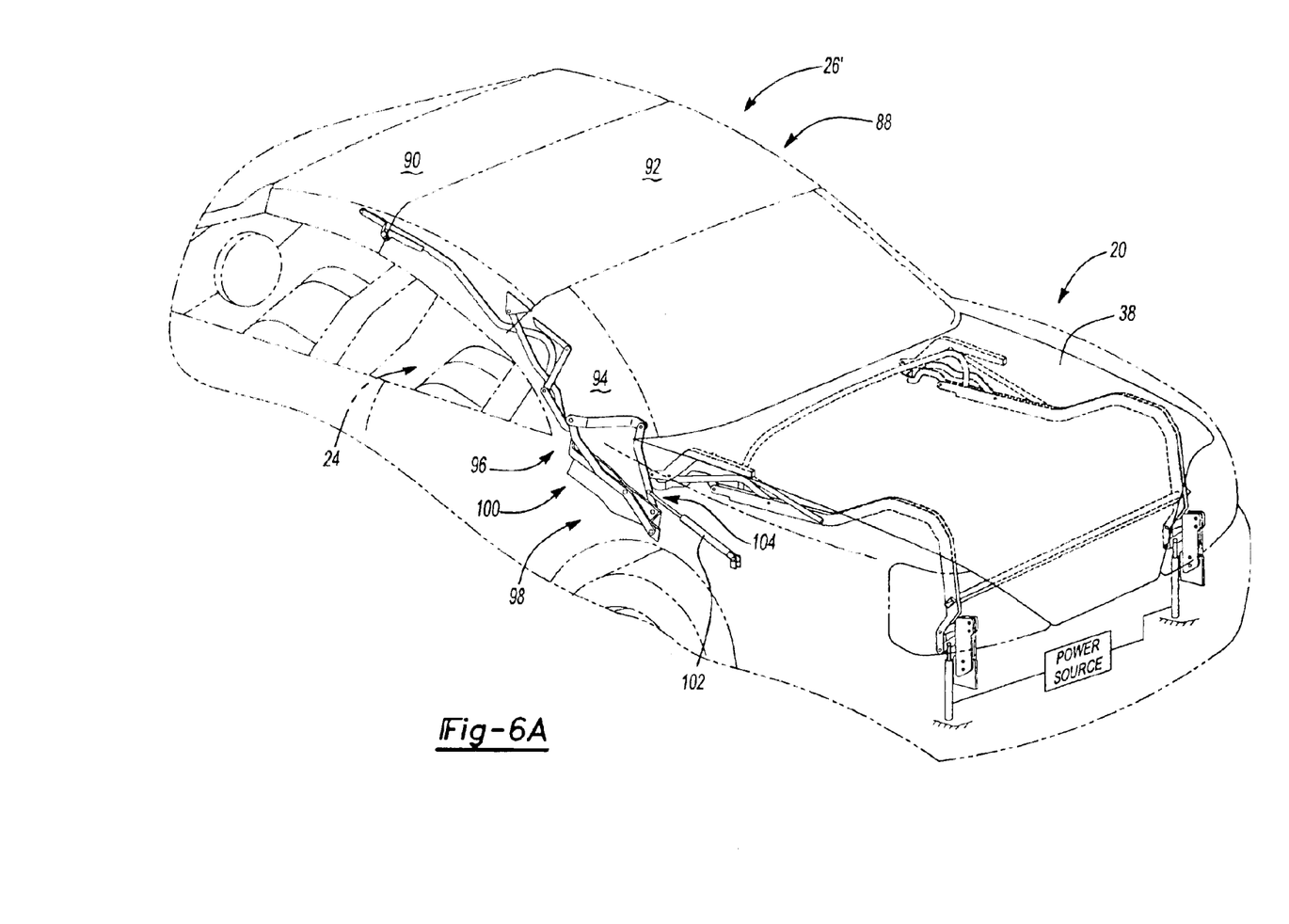
FIG. 6A is a fragmented perspective view of a hardtop convertible roof vehicle with a decklid assembly according to the principles of the present invention.
Figure 6B:
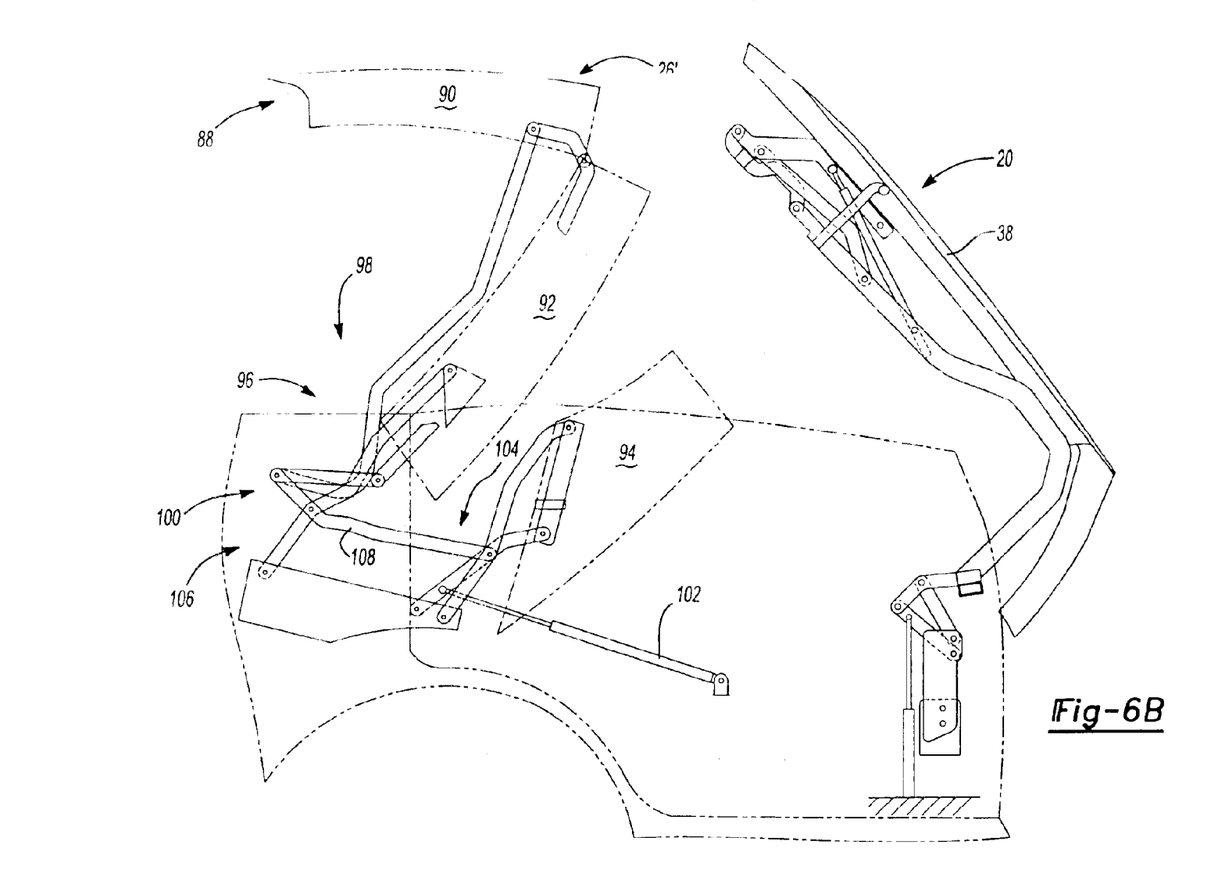
FIG. 6B is a fragmented elevation view of the vehicle of FIG. 6A with the hardtop convertible roof in an intermediate position and the decklid assembly open to allow retraction and extension of the hardtop convertible roof.
Figure 6C:
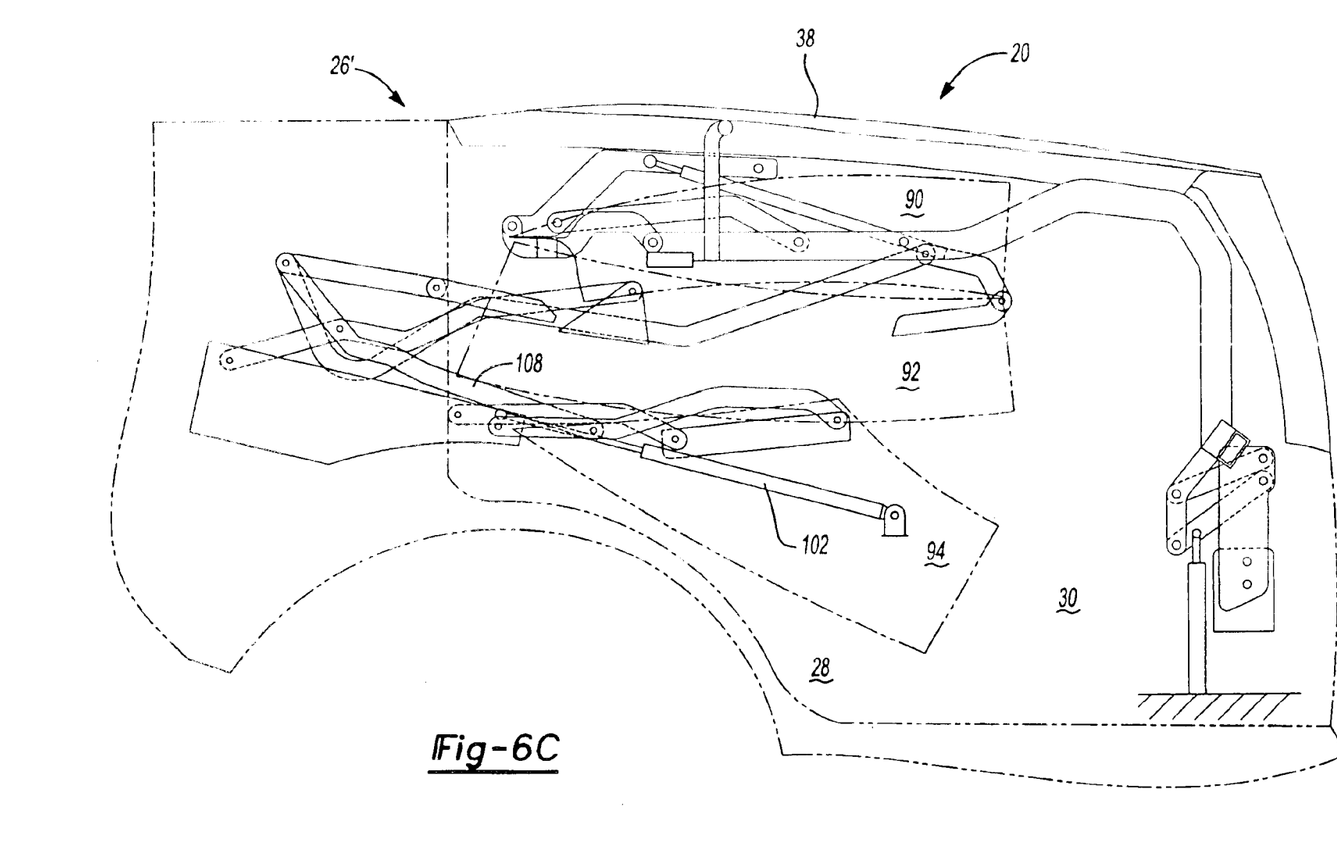
FIG. 6C is a fragmented elevation view of the vehicle of FIG. 6A with the hardtop convertible roof in a fully retracted position and the decklid assembly closed.

Modular decklid assembly 20 can be used on a vehicle 22 having a convertible roof system 26 that is a hardtop convertible roof system 26', such as that shown in FIGS. 6A–C or, alternatively, a soft-top convertible roof system 26", such as that shown in FIGS. 7A–C which will be further described hereinafter. Referring to FIGS. 6A–C, modular decklid assembly 20 is shown being used with a hardtop convertible roof system 26'. Hardtop convertible roof system 26' is the same as that disclosed in U.S. Ser. No. 10/245,973 filed on Sep. 18, 2002, entitled "Vehicle Retractable Hardtop Roof" by Willard and assigned to the assignee of this Application, the disclosure of which is incorporated by reference herein.

Hardtop convertible roof system 26' is moveable between an extended or raised position, shown in FIG. 6A, wherein the passenger compartment 24 is covered by the hardtop convertible roof system 26' and a retracted or stowed position, as shown in FIG. 6C, wherein the hardtop convertible roof system 26' is stored in stowage compartment 28 and covered by decklid 38. Hardtop convertible roof system 26' includes a convertible roof 88. Convertible roof 88 includes a first roof section 90, a second roof section 92, a third roof section 94, and a retraction mechanism 96. Each of the first, second and third roof sections are substantially rigid members interconnected to one another by a retraction mechanism 96. Retraction mechanism 96 is mounted in a cavity of stowage compartment 28. Retraction mechanism 96 includes a pair of actuation assemblies 98 mounted near each outboard edge of vehicle 22. Each of the actuation assemblies 98 are substantially identical mirror images to one another and only the driver side actuation assembly is depicted.

Actuation assembly 98 includes a linkage assembly 100 coupled to an actuator 102. Actuator 102 is depicted as a hydraulic cylinder coupled to linkage assembly 100. It should be appreciated that actuator 102 may alternately be constructed as an electric motor, a pneumatic cylinder or any suitable power source for driving linkage assembly 100. Preferably, actuator 102 is the same type of actuator as powered actuator 46.

Modular decklid assembly 20 is controlled to coordinate the movement of modular decklid assembly 20 with that of convertible roof 88 such that stowage compartment 28 is accessible when moving convertible roof 88 between the raised and stowed positions. As depicted in FIG. 6B, first roof section 90 pivots relative to second roof section 92 in a clamshell manner such that an inner surface of first roof section 90 approaches an inner surface of second roof section 92 while third roof section 94 begins to enter stowage compartment 28.

With reference to FIG. 6C, convertible roof 88 is shown in the stowed position. In the stowed position, first roof section 90 and second roof section 92 are each positioned in a substantially horizontal manner within roof stowage compartment 28. Once in the stowed position, modular decklid assembly 20 is operated to cause frame 34 to move from its open position to its closed position and cover convertible roof 88 with decklid 38.

Figure 7A:
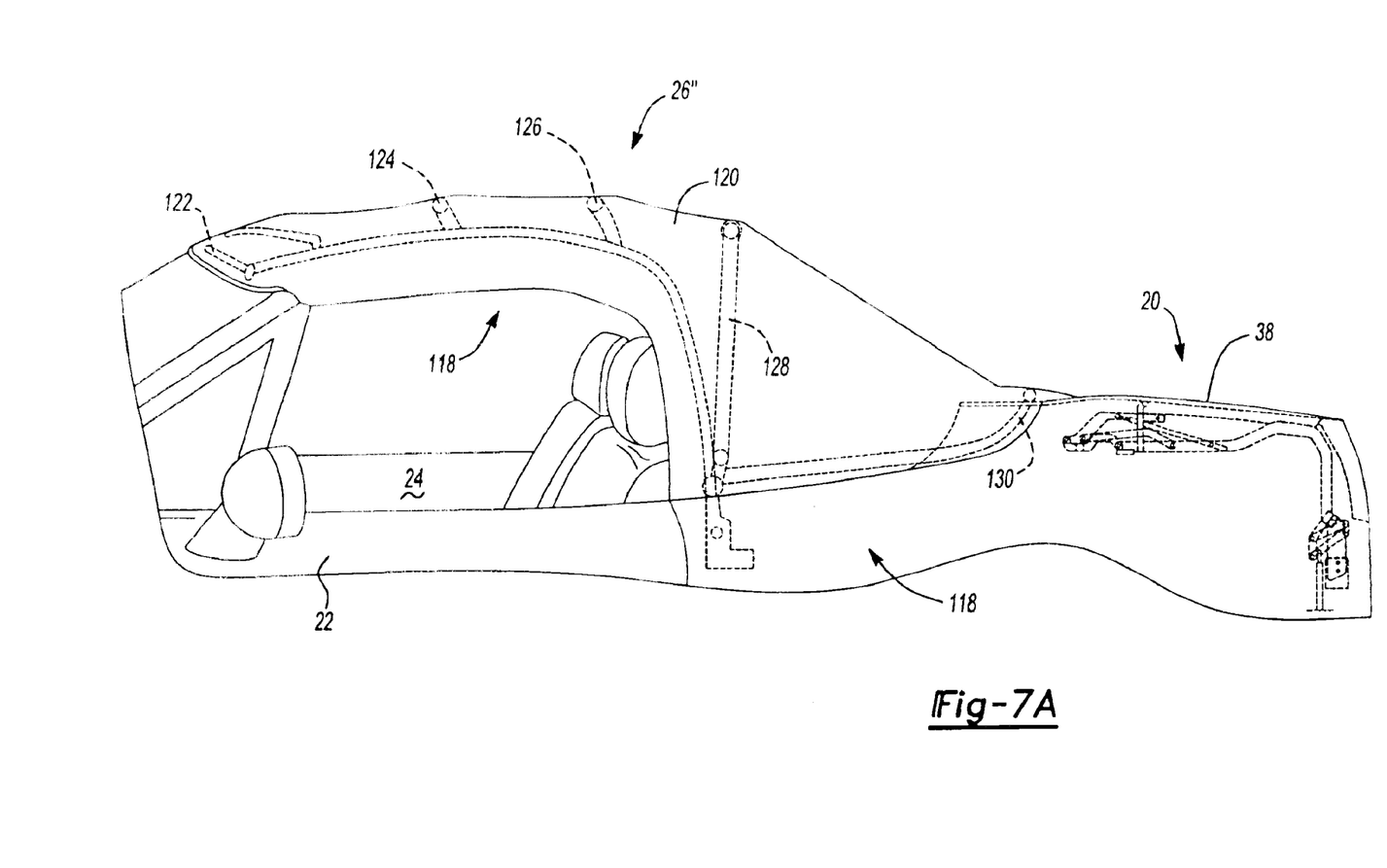
FIG. 7A is a fragmented elevation view of a soft-top convertible roof vehicle with a decklid assembly according to the principles of the present invention.
Figure 7B:
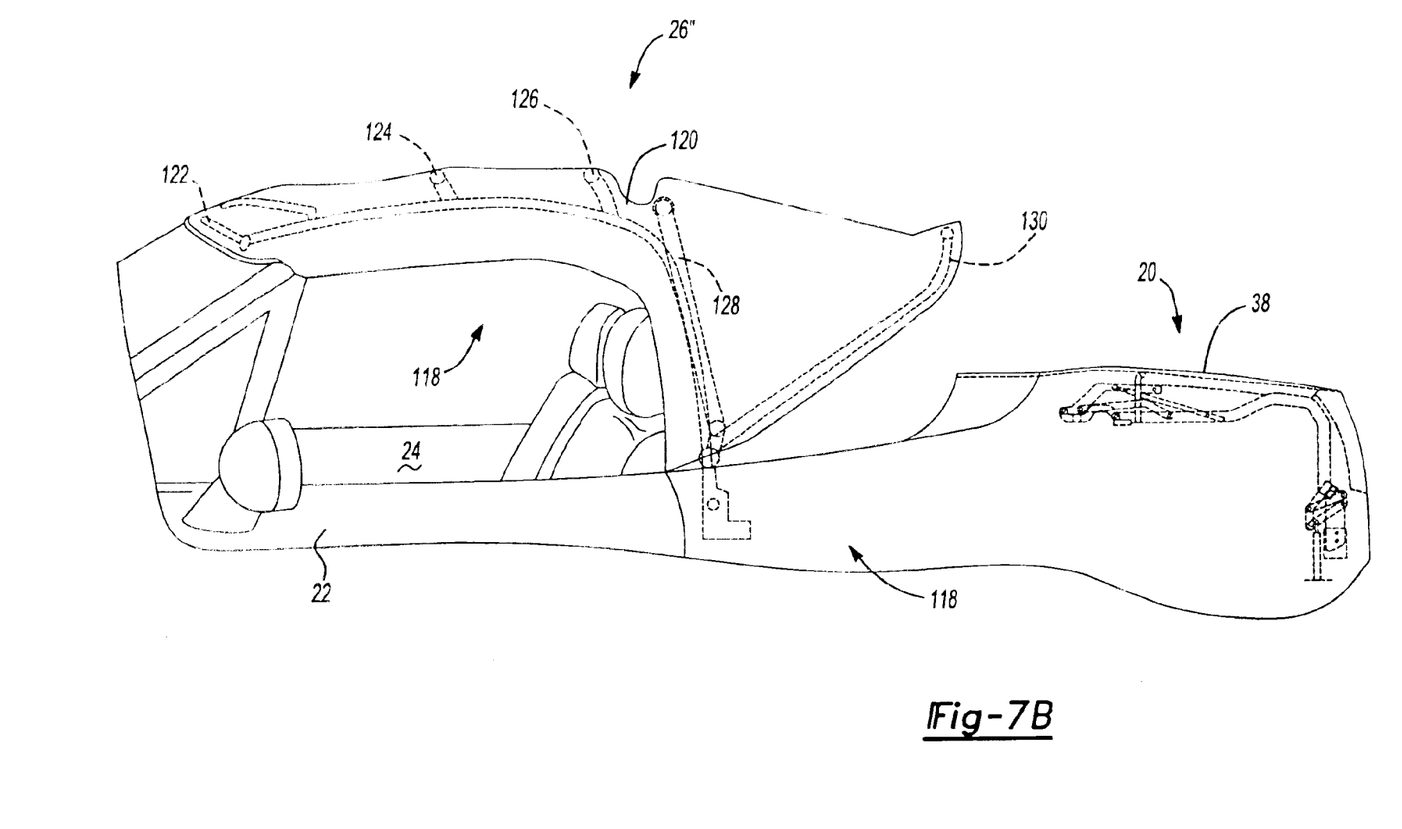
FIG. 7B is a fragmented elevation view of the vehicle of FIG. 7A with the rearmost roof bow of the soft-top convertible roof in an upright position and the decklid assembly closed.
Figure 7C:
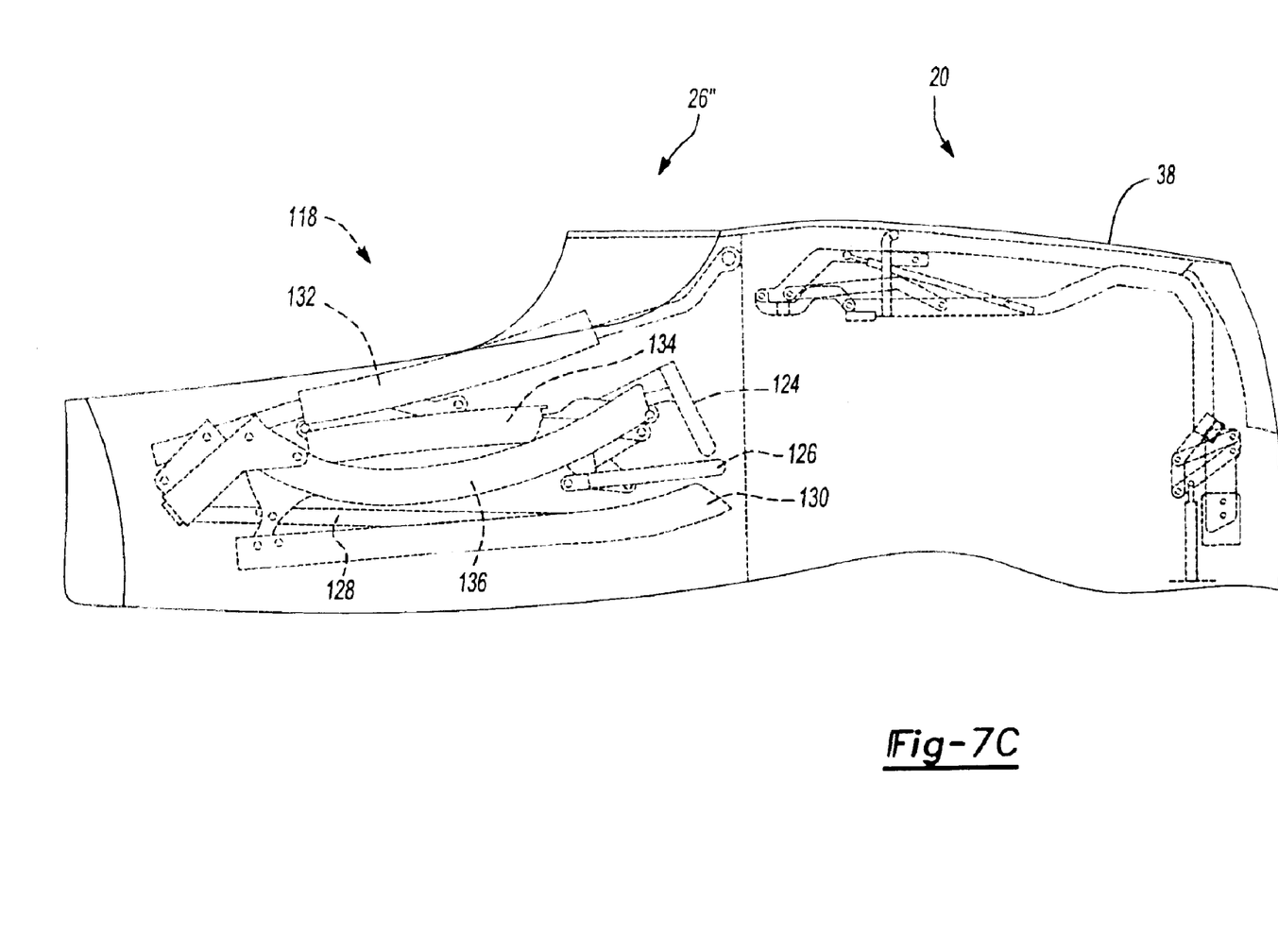
FIG. 7C is a fragmented elevation view of the vehicle of FIG. 7A with the soft-top convertible roof in a fully retracted position and the decklid assembly closed.

Referring now to FIGS. 7A–C, modular decklid assembly 20 is shown on a vehicle 22 having a soft-top convertible roof system 26". Soft-top convertible roof system 26" includes a linkage assembly or top stack mechanism 118 covered by a pliable fabric top covering 120. More specifically, the linkage assembly includes a number one roof bow 122, a number two roof bow 124, a number three roof bow 126, a number four roof bow 128, and a number five or rearmost bow 130. The top stack mechanism 118 also includes a front roof rail 132, a center roof rail 134, and a rear roof rail 136 (shown in FIG. 7C).

As can be seen in FIG. 7C, front roof rail 132 is pivotally coupled to center roof rail 134 and is controlled by a linkage assembly. Center roof rail 134 is pivotally coupled to rear roof rail 136 and is controlled by a different linkage assembly. Soft-top convertible roof system 26" is operable to move between a raised or extended position covering passenger compartment 24, as shown in FIG. 7A, through intermediate positions, such as that shown in FIG. 7B, to a fully retracted or stowed position within stowage compartment 28, as shown in FIG. 7C.

In operation, when it is desired to move soft-top convertible roof system 26" from the raised position to the stowed position, number five roof bow 130 is rotated upwardly and forwardly, as shown in FIG. 7B, an amount sufficient to allow frame 34 of modular decklid assembly 20 to be moved from its closed to its open position. Once number five roof bow 130 has moved a sufficient distance, modular decklid assembly 20 is operated to cause frame 34 to move from its closed to its open position to allow access to stowage compartment 28. Soft-top convertible roof system 26" is then retracted into stowage compartment 28, as shown in FIG. 7C. As can be seen, the roof rails 132, 134 and 136 rotate relative to one another and are stacked on top of one another when in the stowed position. Modular decklid assembly 20 is then operated to cause frame 34 to move to its closed position thereby causing decklid 38 to cover at least a portion of soft-top convertible roof system 26". While soft-top convertible roof system 26" is shown as being a manually operated soft-top convertible roof system, it should be appreciated that movement of soft-top convertible roof system 26" between its extended and stowed positions can be automated through the use of powered actuators such as hydraulic cylinders, electric motors, pneumatic cylinders or any suitable power source for driving top stack mechanism 118.

Thus, modular decklid assembly 20 provides a decklid assembly that covers and conceals stowage compartment 28 and storage area 30. Modular decklid assembly 20 can be opened to allow access to stowage compartment 28 so that a convertible roof system 26 can move between extended and retracted positions. Modular decklid assembly 20 can also be operated to cause decklid 38 to open to allow access to storage area 30. Thus, modular decklid assembly 20 provides a two-way opening decklid assembly that can be used with a convertible roof vehicle that employs either a soft-top convertible roof system or a hardtop convertible roof system.

While modular decklid assembly 20 has been shown as being powered by actuator 46, it should be appreciated that modular decklid assembly 20 can be a completely manually operated assembly. When modular decklid assembly 20 is manually operated, it is preferred that a biasing member, such as a spring or gas strut be employed to assist in moving frame 34 from its closed to its open position. It should be appreciated that front linkage assemblies 40 can include a powered actuator, such as those discussed above, to cause front linkage assemblies 40 to move decklid 38 between its open and closed positions. Thus, movement of decklid 38 between its open and closed positions can be power actuated and be within the scope of the present invention.

Moreover, modular decklid assembly 20 can be used with other convertible roof systems beyond the specific hardtop and soft-top convertible roof systems disclosed. For example, decklid assembly 20 can be used with a vehicle having an outfolding convertible roof such as that disclosed in U.S. Pat. No. 4,828,317 entitled "Convertible Top Frame with Quarter Windows" by Muscat, and with a vehicle having a soft-top convertible roof system such as that disclosed in U.S. Pat. No. 6,288,511 entitled "Automotive Convertible Top System" by Porter et al. and assigned to the assignee of this Application, the disclosures of which are incorporated by reference herein.

It should be appreciated that a lock or latching mechanism (not shown) can be employed to retain decklid 38 in a closed position so that decklid 38 does not inadvertently open. Further, it should be appreciated that when frame 34 is manually operated a lock or latching mechanism (not shown) can be employed that locks or latches frame 34 in the closed position to avoid inadvertent opening or movement of frame 34.

Furthermore, it should be appreciated that decklid assembly 20 can be put on a vehicle 22 as a non-modular unit although various advantages of the present invention may not be realized. That is, the individual components that comprise decklid assembly 20 can be installed individually or in different groupings and still be within the scope of the present invention. For example, frame 34 and rear and front linkage assemblies 36 and 40 can be preassembled in a separate facility or in a static station. The frame 34 and rear and front linkage assemblies 36 and 40 can then be installed in storage area 30 of vehicle 22 by aligning one of the links in each of the two rear linkage assemblies 36 with brackets 32 in storage area 30 of vehicle 22. Decklid 38 can then be attached to front linkage assemblies 40 and adjusted into proper positioning relative to the body of vehicle 22. Decklid 38 can be cycled into its open position and locked into the open position to hold in that position for the painting process. After the painting process has been completed, a latching mechanism can be installed on decklid 38 and gas struts 80 can be installed. Decklid 38 can then be moved to its closed position and frame 34 can be operated to its open position. Once in the open position, powered actuators 46 can be installed on vehicle 22 and on rear linkage assemblies 36. If desired, powered actuators 46 can be installed as part of the installation of the convertible roof system 26. Thus, it is not necessary for the decklid assembly to be a modular unit to be within the scope of the present invention. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A modular decklid assembly for a vehicle, the modular decklid assembly comprising:
   a frame operable between open and closed positions;
   a decklid pivotally coupled to said frame and operable between open and closed positions, said decklid capable of movement independent of said frame; and
   wherein said frame and said decklid are adapted to be installed in the vehicle as a modular unit.

2. The modular decklid assembly of claim 1, wherein said decklid is pivotally coupled to said frame by an at least four bar linkage assembly.

3. The modular decklid assembly of claim 2, further comprising a gas strut having a first end attached to said decklid and a second end attach to said frame.

4. The modular decklid assembly of claim 1, further comprising a powered actuator operable to cause said frame to move between said open and closed positions.

5. The modular decklid assembly of claim 4, wherein said actuator, said frame and said decklid are installed in the vehicle as a modular unit.

6. The modular decklid assembly of claim 1, wherein said frame remains stationary when said decklid moves between said open and closed positions to allow rear access.

7. The modular decklid assembly of claim 1, further comprising:
   a linkage assembly including at least a four bar linkage that couples said frame to the vehicle; and
   said linkage assembly, said frame and said decklid being installed in the vehicle as a modular unit.

8. The modular decklid assembly of claim 1, wherein said frame has a front portion and a rear portion, said rear portion of said frame is pivotally coupled to the vehicle and said decklid is pivotally coupled to said front portion of said frame.

9. A decklid assembly comprising:
   a frame operable between open and closed positions;
   an at least four bar, non-scissor linkage assembly attached to said frame and adapted to be attached to a vehicle, said linkage assembly being operable to move said frame between said open and closed positions; and
   a decklid coupled to said frame and operable between open and closed positions independently of said frame, and said decklid moving with said frame when said frame moves between its open and closed positions.

10. The decklid assembly of claim 9, further comprising a linkage assembly coupling said decklid to said frame.

11. The decklid assembly of claim 10, wherein said linkage assembly coupling said decklid to said frame is an at least four bar linkage assembly.

12. The decklid assembly of claim 9, further comprising a gas strut coupled to said decklid and coupled to said frame.

13. The decklid assembly of claim 9, further comprising a powered actuator coupled to said linkage assembly and operable to cause said linkage assembly to move said frame between said open and closed positions.

14. The decklid assembly of claim 9, wherein said at least four bar linkage assembly is a four bar linkage assembly.

15. The decklid assembly of claim 9, wherein said frame has a front portion and a rear portion, said linkage assembly is attached to said rear portion of said frame and said decklid is coupled to said front portion of said frame.

16. An automotive vehicle system comprising:
   a frame operable between first and second positions;
   an at least four bar linkage assembly having at least two moving links that are free of crossing one another, said linkage assembly being coupled to said frame and operable to move said frame between said open and closed positions; and
   a lid coupled to said frame and operable between open and closed positions independently of said frame.

17. The system of claim 16, further comprising a convertible roof system including a convertible roof operable between extended and retracted positions.

18. The system of claim 17, wherein said convertible roof system includes a hardtop convertible roof.

19. The system of claim 17, wherein said convertible roof system includes a soft-top convertible roof.

20. The system of claim 17, wherein said frame opens to allow said convertible roof to move between said extended and retracted positions.

21. The system of claim 16, further comprising an at least four bar linkage assembly coupling said lid to said frame.

22. The system of claim 16, further comprising a strut having a first end coupled to said lid and a second end coupled to said frame.

23. The system of claim 16, further comprising a powered actuator coupled to said linkage assembly and operable to cause said linkage assembly to move said frame between said open and closed positions.

24. An automotive vehicle comprising:
   a convertible roof system operable between extended and retracted positions; and
   a decklid system including:
      a frame operable between open and closed positions;
      a linkage assembly including at least a four bar linkage, wherein each link of said linkage assembly is attached to two or less other links of said linkage assembly, said linkage assembly being attached to said frame and to the vehicle and said linkage assembly being operable to move said frame between said open and closed positions; and
      a trunk cover coupled to said frame and operable between open and closed positions independently of said frame, and said trunk cover moving with said frame when said frame moves between said frame open and closed positions.

25. The automotive vehicle of claim 24, wherein said convertible roof system includes a hardtop convertible roof.

26. The automotive vehicle of claim 25, wherein said hardtop convertible roof has at least three substantially rigid panels.

27. The automotive vehicle of claim 26, wherein at least one of said panels is stowed substantially horizontally below said trunk cover when said convertible roof system is in said stowed position.

28. The automotive vehicle of claim 24, wherein said linkage assembly is a first linkage assembly and said decklid system further includes a second linkage assembly coupling said trunk cover to said frame.

29. The automotive vehicle of claim 28, wherein said second linkage assembly is an at least a four bar linkage assembly.

30. The automotive vehicle of claim 24, wherein said convertible roof system includes a soft-top convertible roof.

31. The automotive vehicle of claim 24, wherein said frame moves to said open position when said convertible roof system moves between said extended and retracted positions.

32. The automotive vehicle of claim 24, wherein said decklid system further includes a strut coupled to said trunk cover and coupled to said frame.

33. The automotive vehicle of claim 24, wherein said decklid system further includes a powered actuator coupled to said linkage assembly and operable to cause said linkage assembly to move said frame between said open and closed positions.

34. The automotive vehicle of claim 24, wherein said frame has a front portion and a rear portion, said linkage assembly is attached to said rear portion of said frame and said trunk cover is coupled to said front portion of said frame.

35. The automotive vehicle of claim 24, wherein said decklid system is installed in the automotive vehicle as a modular unit.

36. A method of installing a modular decklid system onto an automotive vehicle wherein the modular decklid system includes a frame operable between open and closed positions and a decklid pivotally coupled to the frame and capable of movement independent of the frame, the method comprising:
   (a) preassembling the decklid to the frame at a first station removed from the vehicle; and
   (b) assembling the modular decklid system at a second station onto the vehicle.

37. The method of claim 36, wherein step (b) further includes coupling the frame to the vehicle.

38. The method of claim 37, wherein step (a) further includes preassembling a linkage assembly to the frame and step (b) further includes attaching said linkage assembly onto the vehicle.

39. The method of claim 38, wherein said linkage assembly is an at least four bar non-scissor linkage assembly and step (b) further includes attaching a link of said linkage assembly onto the vehicle.

40. The method of claim 36, wherein step (a) further includes preassembling a linkage assembly to the frame and coupling the decklid to the frame with said linkage assembly.

41. The method of claim 36, wherein the modular decklid system includes a powered actuator operable to move the frame between the open and closed positions, step (a) further includes preassembling said actuator to the modular decklid system, and further including the step of connecting a power source to said actuator.

42. The method of claim 36, further including the step of coupling a powered actuator to the vehicle and to the frame wherein said actuator is operable to cause the frame to move between the open and closed positions.

43. The method of claim 36, wherein step (b) further includes assembling the modular decklid system onto a rear portion of the vehicle.

44. A modular decklid assembly for a vehicle, the modular decklid assembly comprising:
   a frame operable between open and closed positions; and
   a decklid pivotally coupled to said frame and operable between open and closed positions,
   wherein said frame and said decklid are adapted to be installed in the vehicle as a modular unit and said decklid is pivotally coupled to said frame by an at least four bar linkage assembly.

45. A modular decklid assembly for a vehicle, the modular decklid assembly comprising:
   a frame operable between open and closed positions;
   a decklid pivotally coupled to said frame and operable between open and closed positions; and
   a powered actuator operable to cause said frame to move between said open and closed positions,
   wherein said frame and said decklid are adapted to be installed in the vehicle as a modular unit.

46. A decklid assembly for a vehicle, the decklid assembly comprising:
   a frame operable between open and closed positions; and
   a decklid pivotally coupled to said frame and operable between open and closed positions, said decklid capable of movement independent of said frame.

47. The decklid assembly of claim 46, wherein said decklid is pivotally coupled to said frame by an at least four bar linkage assembly.

48. The decklid assembly of claim 46, further comprising a powered actuator operable to cause said frame to move between said open and closed positions.

* * * * *